Jan. 21, 1936.  H. E. ROGERS  2,028,624
APPARATUS FOR MAKING CASTINGS
Filed June 26, 1933   7 Sheets-Sheet 4
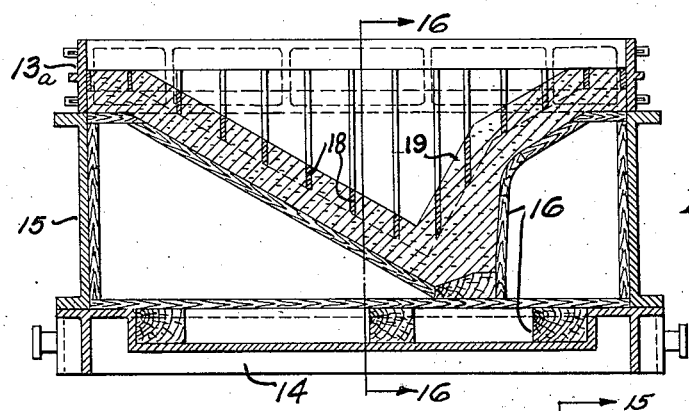
Fig-15-
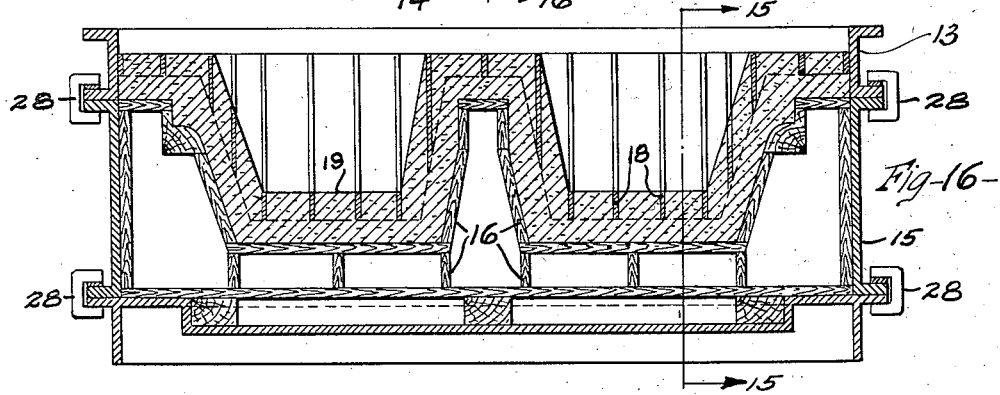
Fig-16-
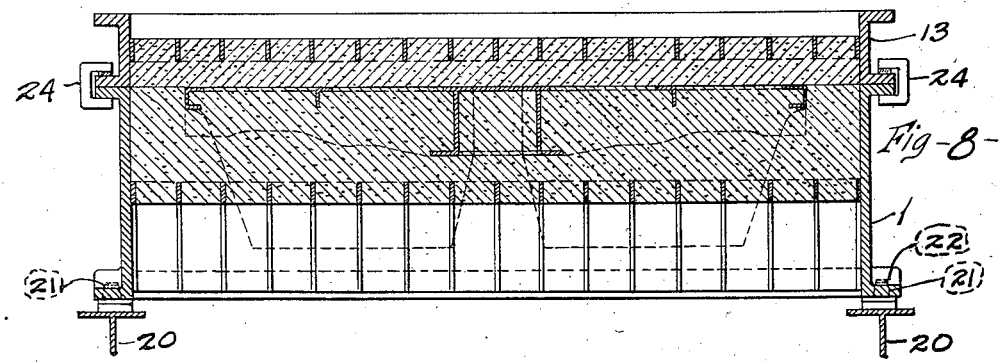
Fig-8-
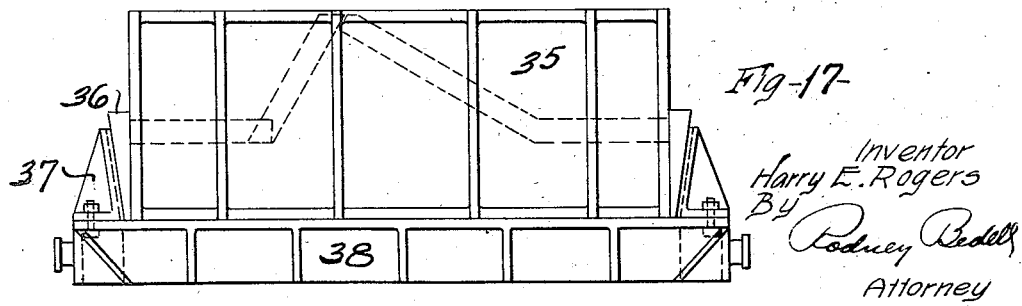
Fig-17-
Inventor
Harry E. Rogers
By Rodney Bedell
Attorney

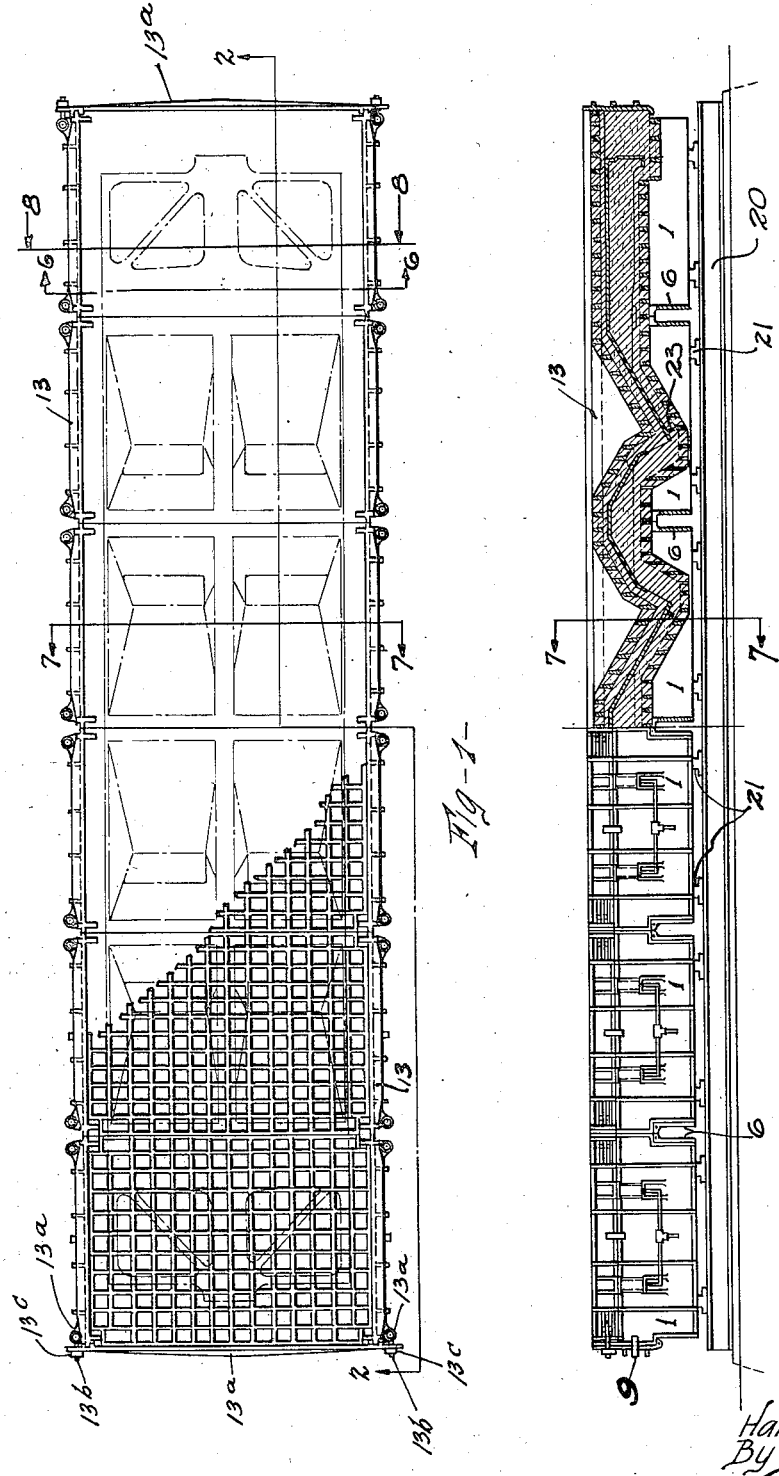

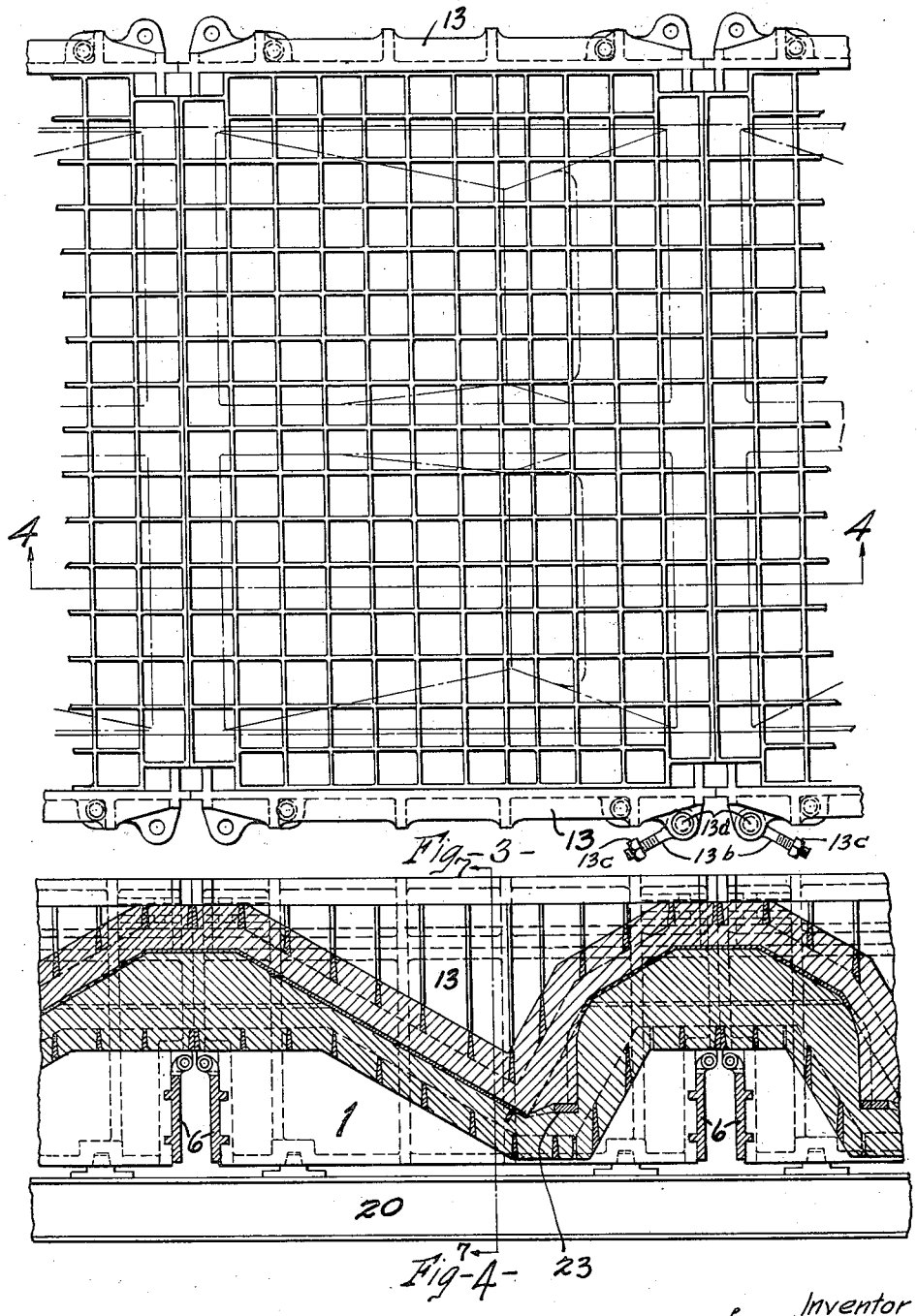

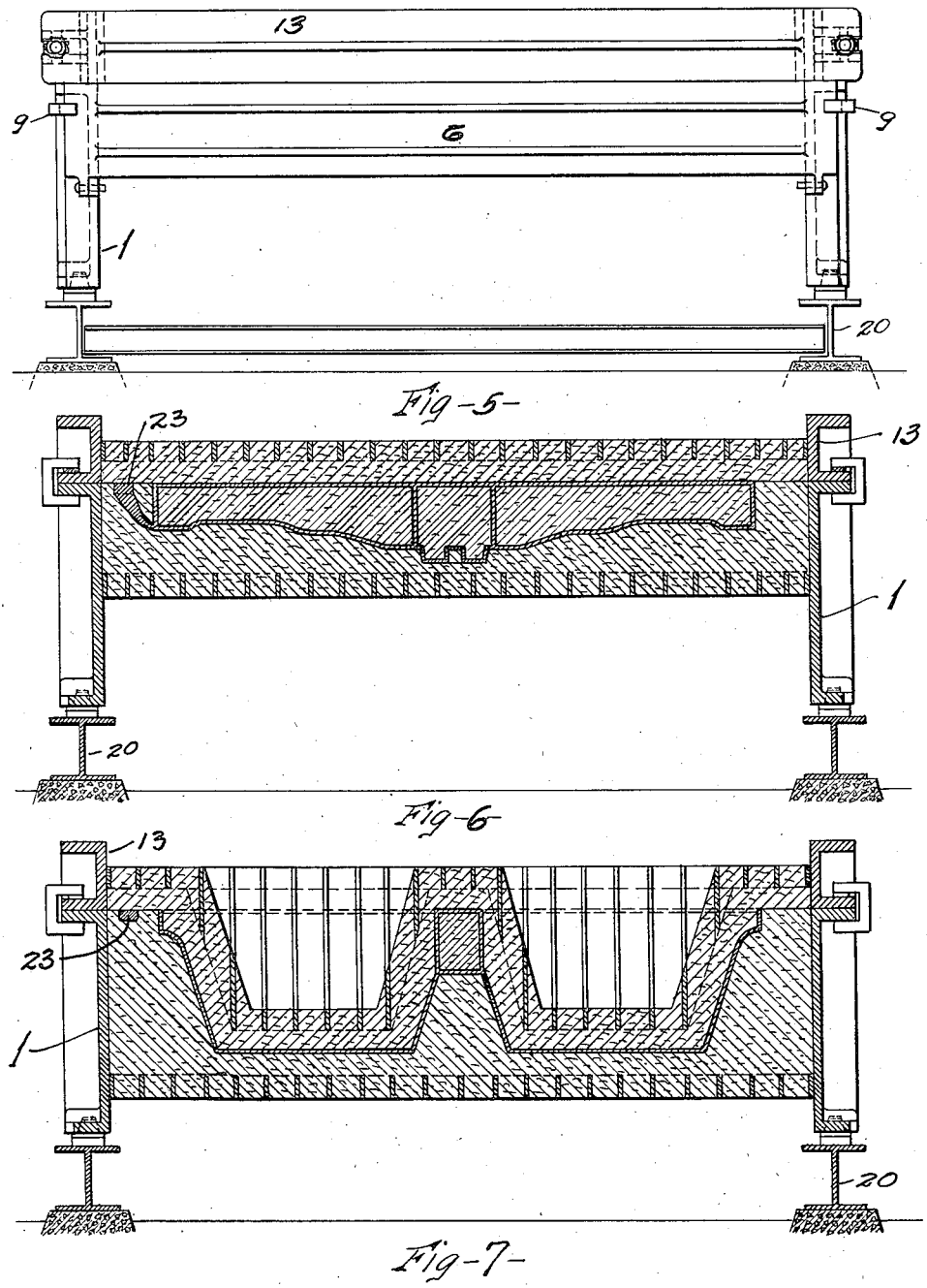

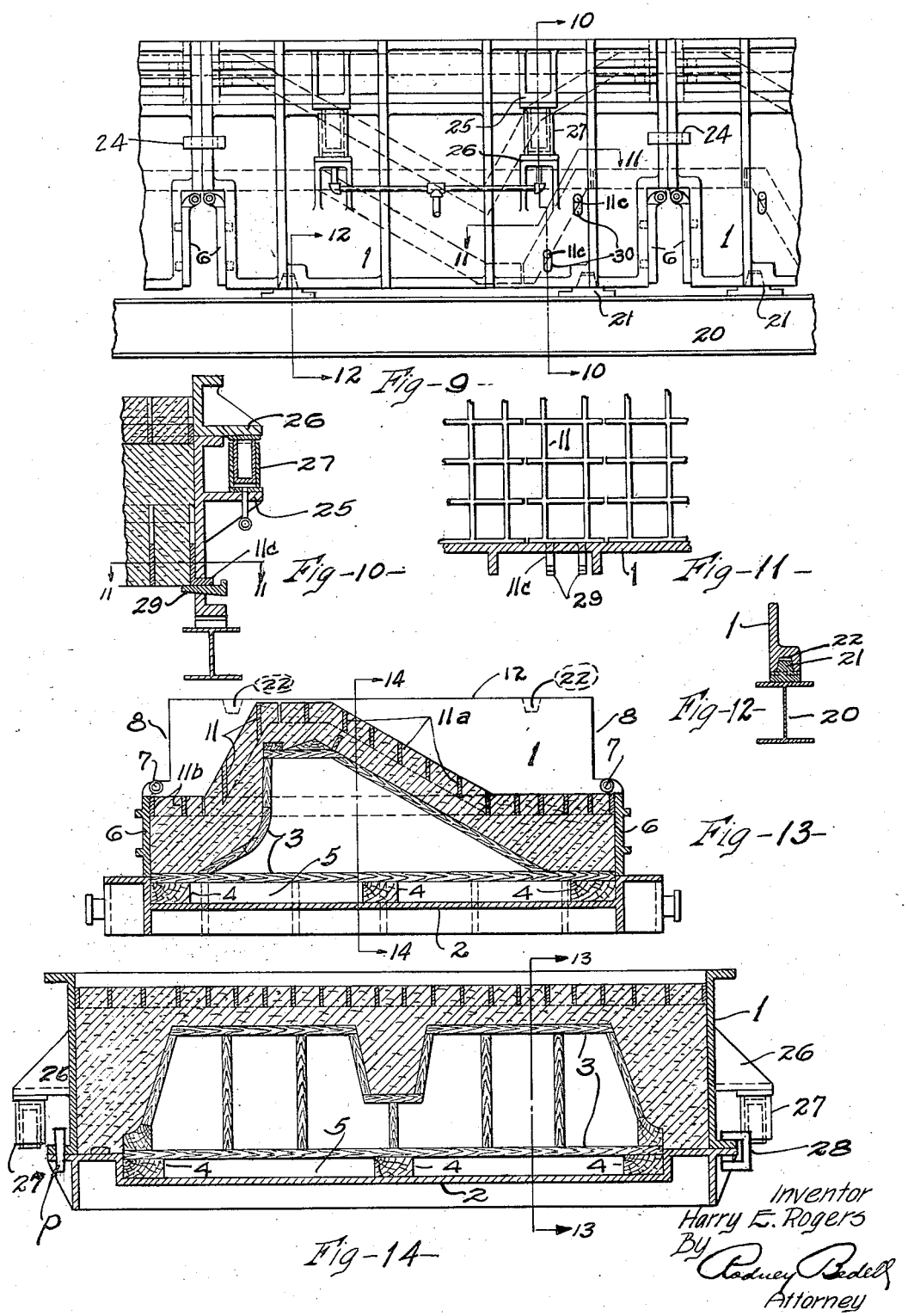

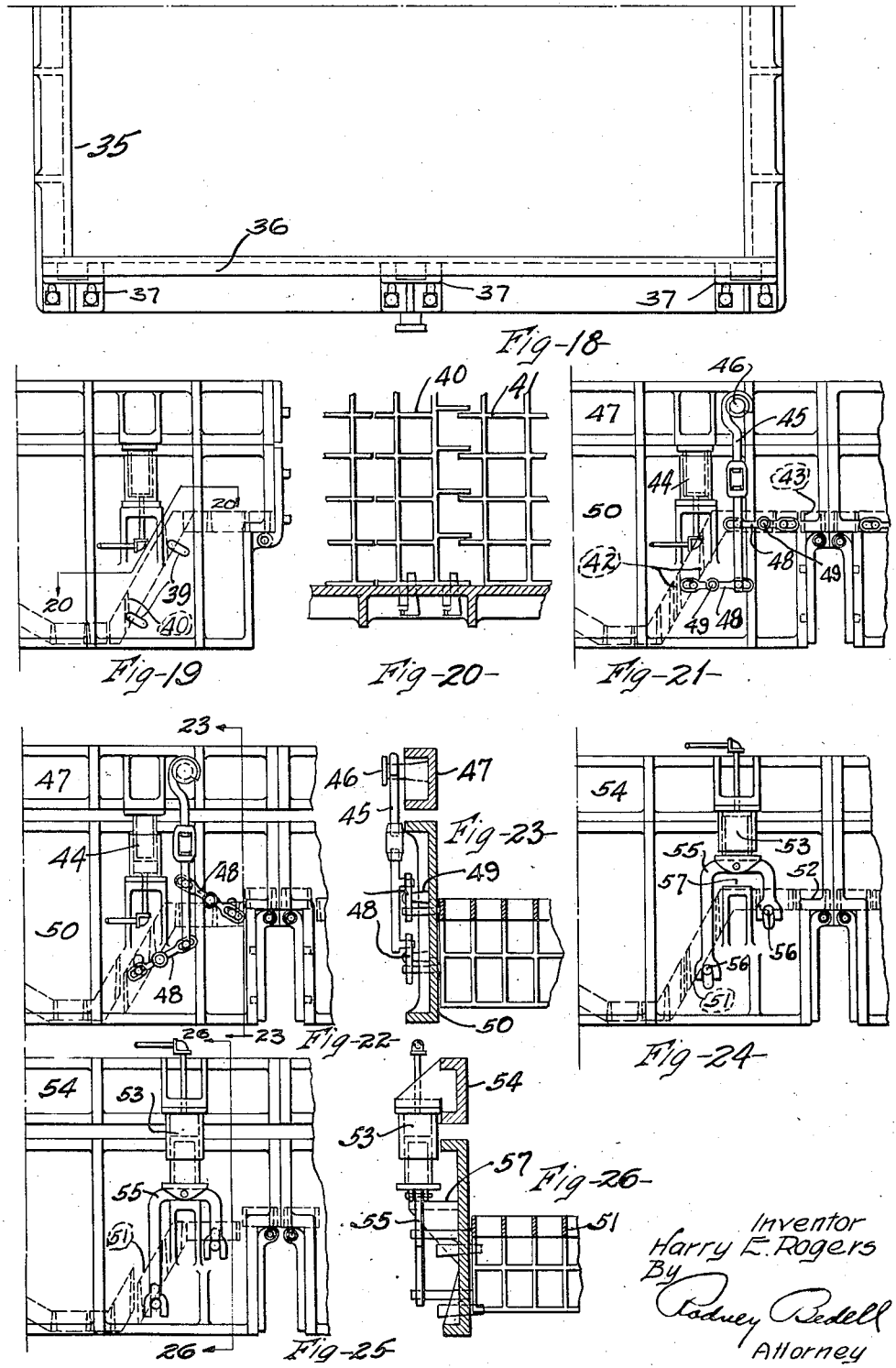

Jan. 21, 1936.        H. E. ROGERS        2,028,624
APPARATUS FOR MAKING CASTINGS
Filed June 26, 1933        7 Sheets-Sheet 7
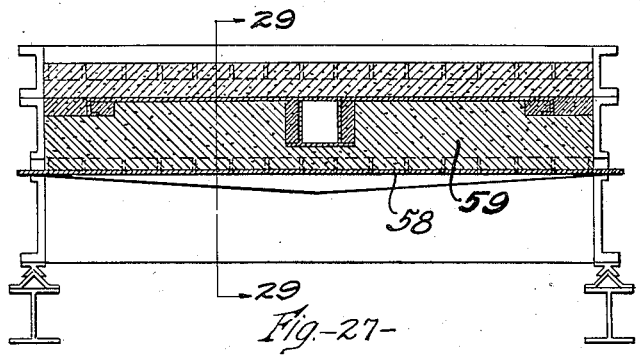
Fig.-27-
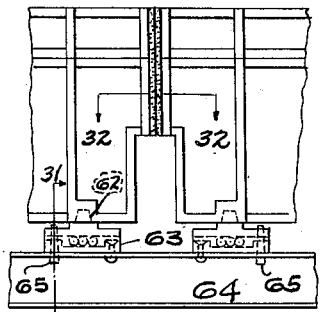
Fig.-30-
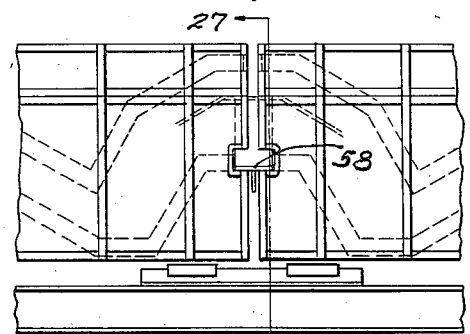
Fig.-28-
Fig.-29-
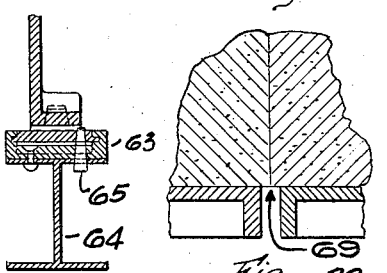
Fig.-31-
Fig.-32-
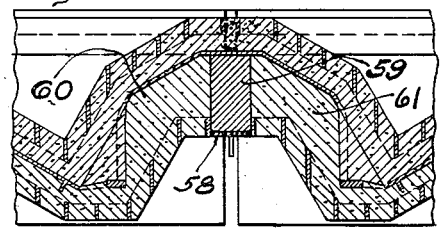
Fig.-34-
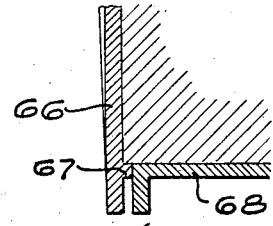
Fig.-33-
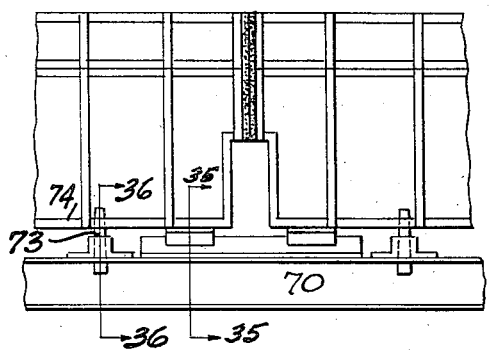
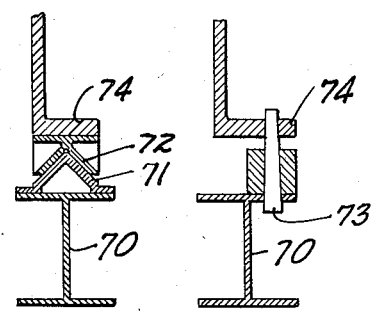
Fig.-35-   Fig.-36-
Inventor
Harry E. Rogers
By Rodney Bedell
Attorney Patented Jan. 21, 1936

2,028,624

UNITED STATES PATENT OFFICE 2,028,624

APPARATUS FOR MAKING CASTINGS

Harry E. Rogers, Wynnewood, Pa., assignor to General Steel Castings Corporation, Granite City, Ill., a corporation of Delaware Application June 26, 1933, Serial No. 677,538

6 Claims. (Cl. 22—92)

The invention relates particularly to the formation of exceptionally large castings and consists in novel mold-forming apparatus and in novel steps taken in the forming of a casting in such apparatus.

One of the problems arising from the making of large castings is the difficulty of handling the flask to the extent necessary for the usual sand ramming or jolting and flask reversing operations. It has been proposed heretofore that sectional molds be utilized in each of which a part of the complete pattern is placed to form a part of the mold matrix and, before the metal is poured, these sections are placed together to form a continuous mold. Such a mold construction is illustrated generally in B. L. Weaver Patent No. 1,233,151. Heretofore, the use of sectional molds has been limited due to the difficulty of connecting the sections. One of the objects of the present invention is to facilitate the formation and assembling and accurate positioning of mold sections of this type.

Where the webs of a casting are comparatively thin, and particularly in large castings, the shrinkage of the cast metal occurring immediately after the pouring and extending throughout the cooling is likely to rupture the thin webs of the casting. Another object of the present invention is to accommodate shrinkage forces more freely than has been possible heretofore.

The formation of a large mold, particularly where the casting has parts of substantial depth and other parts of relatively shallow depth usually includes the use of molds of maximum depth from end to end and this involves the handling of large quantities of sand, the conditioning of which is expensive, the ramming or jolting of which in the mold is also expensive and time-consuming, and the handling of deep molds filled with sand from top to bottom and from end to end is very difficult.

Another object of the present invention is to reduce the quantity of the sand required for the mold of a casting of the type referred to.

These general objects and numerous detail objects referred to below are attained by use of the structure illustrated in the accompanying drawings and by following the steps described below.

In the drawings—

Figure 1 is a top view of a complete mold for casting in one piece the center sills, side sills, end platforms, hoppers and intermediate transoms of a ralway hopper car. The mold comprises a plurality of sections assembled with each other. The casting to be produced in the mold is indicated generally by dot and dash lines.

Figure 2 is in part a side elevation and in part a longitudinal section through the mold and the casting formed therein and is taken approximately on the line 2—2 of Figure 1.

Figure 3 is a top view on an enlarged scale of one of the mold sections, with portions of the adjacent sections also shown.

Figure 4 is a longitudinal vertical section taken on the line 4—4 of Figure 3.

Figure 5 is an end view of the mold.

Figures 6, 7 and 8 are vertical transverse sections taken on the corresponding section lines of Figures 1, 2 and 4.

Figure 9 is a side elevation of the parts shown in Figure 3.

Figures 10 and 12 are detail vertical sections taken on the corresponding section lines of Figure 9.

Figure 11 is a detail horizontal section taken on the line 11—11 of Figure 9.

Figures 13 and 14 are vertical sections taken on transverse planes through an individual drag section, including the pattern and molding sand, showing the same mounted an a rollover plate, Figure 13 being taken approximately on the line 13—13 of Figure 14 and Figure 14 being taken approximately on the line 14—14 of Figure 13.

Figures 15 and 16 are similar sections through the corresponding cope section showing the same mounted upon a rollover plate by means of a spacer which is used temporarily, as will be explained below, Figure 15 being taken on the line 15—15 of Figure 16 and Figure 16 being taken on the line 16—16 of Figure 15.

Figure 17 is a side elevation of a modified drag section mounted on a roll-over plate, the drag section having a different end construction than that of the previous figures and being secured to the roll-over plate in a different manner.

Figure 18 is a top view of one end of the structure shown in Figure 17.

Figures 19 and 20 illustrate a modified detail of construction, Figure 19 being a fragmentary side elevation of assembled drag and cope sections, and Figure 20 being a generally horizontal section taken on the line 20—20 of Figure 19.

Figures 21, 22 and 23 illustrate another modification of corresponding parts, Figure 21 being a side elevation of a part of a drag and cope assembly, Figure 22 being a similar elevation showing the parts in a different position, and Figure 23 being a vertical section on the line 23—23 of Figure 22.

Figures 24, 25 and 26 correspond to Figures 21, 22 and 23 but illustrate a further modification of this part of the invention.

Figure 27 is a transverse vertical section through the mold and its supporting structure illustrating a modification of the support elements and is taken on the line 27—27 of Figure 28.

Figure 28 is a fragmentary side elevation of the same showing the adjacent ends of two mold sections.

Figure 29 is a fragmentary longitudinal vertical section taken on the line 29—29 of Figure 27.

Figures 30, 31 and 32 illustrate another modification in the mold supporting arrangement, Figure 30 corresponding generally to Figure 28, Figure 31 being a transverse vertical section on the line 31—31 of Figure 30, and Figure 32 being a horizontal section on the line 32—32 of Figure 30.

Figure 33 illustrates a detachable part of the flask section used in forming the mold parts illustrated in Figure 32.

Figure 34 corresponds to Figure 28 but illustrates an additional detail for positioning the sections on the supporting structure.

Figures 35 and 36 are vertical transverse detail sections taken on the corresponding section lines of Figure 34.

Referring to Figures 13 and 14, the pattern 3 is placed on a rollover plate 2, the body of which has a depression 5. The pattern includes heavy reinforcing members 4 projecting beyond what would be the normal surface of the pattern corresponding to the parting line between the cope and drag sections. The members 4 fit into depression 5 to accurately position the pattern relative to the edges of the plate. The drag flask 1 is then placed in inverted position on the rollover plate 2 and over the pattern 3, being accurately positioned in relation to the plate and pattern by means of flask pins P inserted through holes in the abutting flanges of the flask and plate. The flask and plate are secured together by C clamps 28 or by bolts through the adjacent flanges.

The ends of drag flask 1 include plates 6 hinged at 7 and these plates form temporary ends to the flask while sand is being rammed in place, being secured in this position by means of C clamps 9 (see Figure 2) similar to clamps 28, or by suitable bolts. At least a part of the pattern 3 extends from contact with the plate 6 at one end of the drag flask to contact with the corresponding end plate 6 at the opposite end of the flask. When the drag is rotated into its upright position (see Figures 4 and 9) plates 6 swing on their hinges into the recesses 8 formed in the sides of the flask. The drag may then be assembled with other drag sections with the end faces of the sand molds abutting.

A metal grid extends between the sides of the drag flask 1 and follows generally the contour of the inclined walls of the pattern. This grid is composed of a plurality of sections such as 11, 11a and 11b. Sections 11a and 11b are preferably fixedly secured to the sides of the flask, while section 11 is movably assembled with the flask by means of projections 11c extending from the grid section through elongated openings 30 in the side of the flask. Wedges 29 are inserted in the remaining portions of openings 30 and hold grid section 11 in alinement with adjacent sections 11a and 11b throughout the formation of the mold and the pouring of the casting and are then removed, as described below. The projections 11c, extending through the sides of the flask, prevent the grids, although being movable, from being disassembled from the flask. Sand is applied to the pattern through the grid meshes and the sand is jolted or rammed up to the upper face of the grid but the space between the grid and the upper edge 12 of the drag frame is not filled with sand, thereby substantially decreasing the quantity of sand required for the mold section and expediting the sand packing operation and facilitating the handling of the section.

After the jolting or ramming operation, the flask 1 and rollover plate 2 are turned over and the plate 2 and pattern 3 removed from the flask. Clamps 9 are removed from all but the end plates of the mold and the released plates 6 swing on their hinges into the position shown in Figures 2, 4 and 9, leaving the mold sand and the matrix formed thereby extending to the extreme end of the flask so as to abut against the adjacent end of another mold section to form a continuous mold and matrix.

The corresponding cope flask 13 (see Figures 15 and 16) is first mounted upon an individual rollover plate 14 by means of a separable spacer frame 15 detachably secured to the flask and the rollover plate by C clamps 28. The pattern 16 projects below the bottom edge of the flask 13 throughout the depth of spacer 15 and is supported directly upon the rollover plate 14 similarly as the pattern 3 is supported on plate 2 in Figure 13.

During the ramming operation, the cope flask end plates 13a are rigidly held in position by means of a swinging bolt 13b and nut 13c (Figures 1 and 3). The end plates 13a are slotted as shown in Figure 5, and the swinging bolt is pivoted to the side of the flask as shown at 13d in Figure 1. These bolts are loosened and the end plates are removed from the flask before the successive sections are assembled with each other.

A metallic grid 18 is applied to the cope flask and follows generally the contour of the pattern wall similarly to the grid provided for the drag flask. Sufficient molding sand 19 is applied to the pattern to extend to the top of the grid only and is then jolted or rammed to the extent necessary to cause it to adhere firmly to the grid. Hence the entire space between the top of the pattern and the top of the flask need not be filled and, accordingly, the quantity of sand required, the time for the jolting or ramming operation, and the difficulty of handling the complete cope section is reduced.

After the jolting operation, the cope is rolled over and the plate 14 and pattern 16 are removed. The cope is then again turned over with the spacer 15 still secured to the flask 13 and retained for supporting the same with the projecting portion of the mold above the floor. When the cope is to be assembled with the drag, the spacer 15 is removed and the matrix can be completed.

The completed mold sections may be assembled with each other on the floor of the foundry, or on a separate framework, particularly if it is desired that the assembled mold be moved as a unit. With either arrangement the supporting structure 20 is provided with a plurality of upstanding tapering dowel pins 21 which are received in corresponding dowel holes 22 formed in the bottoms of the mold drags 1. This dowel arrangement makes it possible to set the sections of the mold drag in place with a crane quickly and accurately with the individual matrices in alinement and with the ends of the different sections in abutting relation. C clamps 24 (Figures 8 and 9) are applied to hold the successive sections to each other and the corresponding copes and drags together.

The side walls of the cope and drag flasks are provided with abutting brackets 25 and 26, respectively, and hydraulic or pneumatic jacks 27 are mounted on the drag brackets and are connected with suitable source of fluid pressure supply upon the erection of the mold.

The mold is now ready for the pouring of the metal. It will be understood that the necessary gate, vent, sprue and runner passages have been formed in the individual sections. Poured metal in some of these passages is indicated at 23 (Figures 2, 4, 6 and 7). The metal may be poured from a single ladle through large passages leading to spaced gates located at intervals throughout the length of the mold, or the metal may be poured from a plurality of ladles directly to spaced gates, or the metal may be poured into the mold through a distributing arrangement, as described in co-pending application of C. F. Frede, filed January 9, 1933, Serial No. 650,849.

Promptly after the metal is poured, i. e., as quickly as the metal has solidified and before it has begun to shrink substantially, wedges 29 are knocked out, permitting the drag grid 11 and the mold sand therein to drop away from the casting to the extent permitted by slots 30 (Figures 9, 10 and 11). At the same time fluid is admitted to the hydraulic jacks 27 and the entire cope with its grid 18 and the mold sand therein is lifted bodily far enough to substantially clear the casting. This removes mold sand pressure from both sides of the restricted portions of the casting abreast of each movable grid section 11 and removes all mold sand pressure from the top of the casting throughout its length and width. This permits the casting to shrink without any substantial restraint by the mold sand and thereby eliminates stretching of the metal with undue thinning of portions, or cracking, or other defects arising from shrinkage strains. At the same time the long and still yielding casting is adequately supported at intervals to prevent undue distortion.

Figures 17 and 18 illustrate a modification of the drag flask structure in which the hinged plates previously described are eliminated and the sand-retaining ends of the flask 35 are formed by end plates 36 of wedge section and held in position by backstops 37 secured to the roll-over plate 38. The holding means are readily loosened and the plates removed when the roll-over plate and flask are turned over. Stops 37 are adjustable along the roll-over plate to provide for different sizes of flasks.

Figures 19 and 20 illustrate a modification of the movable grid arrangement in which the slots 39 in the sides of the drag flask extend at right angles to the plane of the adjacent portion of the matrix. Upon release, the grid section 40, with the mold sand therein, moves longitudinally and downwardly instead of vertically downwardly as previously described. In order to accommodate such movement of the grid section 40, the same is telescopingly assembled with the adjacent grid section 41.

Figures 21, 22 and 23 illustrate another modification of the movable grid section structure in which the grid sections 42 and 43 are moved downwardly by the pneumatic jack 44 which also lifts the cope. This movement of the grid sections is obtained by means of an adjustable link 45 having one end engaging a pin 46 on the cope flask 47 and having pin and slot connections with the outer ends of levers 48 pivoted on pins 49 projecting from the sides of the drag flask 50, the inner ends of levers 48 having pin and slot engagement with grid sections 42 and 43. When fluid under pressure is admitted to the jacks and the cope flask 47 raised, levers 48 will be rotated from the position shown in Figure 21 to the position shown in Figure 22, thereby positively moving the grid sections 42 and 43 downwardly. The grid sections 42 and 43 will be supported in their normal position during the jolting operation by means of wedges, as previously described, which, of course, will be removed as soon as the casting is poured. The link 45 is not in place during the jolting operation of either of the flasks but is applied after the mold is closed.

Figures 24, 25 and 26 show another means for lowering the grid section 51 at the same time the cope is raised. This construction includes a fluid pressure jack 53 mounted on the cope flask 54. The lower end of the jack plunger mounts a yoke 55, the arms of which engage individual pins 56 projecting from the grid section 51. When fluid pressure is supplied to the jack, the plunger is moved downwardly, lowering the grid section 51 until the cross bar of the yoke or the connection thereof to the plunger strikes the bracket 57 on the drag flask, whereupon the entire cope is raised, as shown in Figure 26.

Another means providing for the collapse of the mold sand after the casting is poured is illustrated in Figures 27, 28 and 29 in which the sections of the mold formed by the drags do not abut but co-operate to support a plate 58 on which rests a core 59 which forms a portion of the lower wall of the matrix between the mold sand 60 of one drag and the mold sand 61 of the adjacent drag. As soon as the casting is poured, plate 58 is removed and the core drops down, permitting sand portions 60 and 61 to collapse and allow the casting to contract.

Figures 30, 31 and 32 illustrate a modified structure in which the contraction of the casting is accommodated by facilitating relative movement of the mold sections. Each dowel pin 62 is mounted on rollers carried in a race 63 fixed on the supporting base 64. A key 65 locks the dowel pin 62 to the race 63 during the pouring of the metal but after the metal is poured, keys 65 are removed and the adjacent mold sections may then move to or from each other under the shrinkage stresses with minimum resistance.

In order for the mold sections to move as just described, it is essential that the rigid frames of the flasks do not abut each other, as illustrated in Figure 9 for example. In order to meet this problem, the flask is provided, during the flask filling and jolting operation, with removable end plates 66 having lugs 67 engaging the ends of the sides 68 of the flask so that the sand engaging face of the end plate is spaced outwardly from the end of the flask side. This provides for a joint between the adjacent flasks which is comprised entirely of sand, as indicated at 69 in Figure 32.

In the construction shown in Figures 34, 35 and 36, the mold is supported on the base 70 by means of V-shaped guide members 71 and 72 provided on the base and the drag flasks, respectively. This arrangement aligns the drag flasks longitudinally and tapered pins 73 passing through the base 70 and the flanges 74 on the drag flasks hold the sections in the desired position longitudinally of the mold during the assembling thereof. These pins are removed immediately after the metal is poured to permit the mold sections relative movement under the forces set up by the cooling metal.

The method of forming a casting which provides for the removal or collapsing of portions of the mold immediately after pouring the metal and before the casting has had opportunity to shrink substantially may be followed by use of any of the apparatus described herein. This method makes possible economical production of large castings of the type illustrated by using molds entirely of green sand and without any substantial percentage of defective castings because of shrinkage strains. While the method and apparatus is described with reference particularly to the formation of a hopper car underframe with integral hoppers, this description is illustrative only and it is to be understood that other castings of substantial size may be produced to advantage by using the method and apparatus described or with such modifications thereof as will readily occur to those skilled in the art as conditions may vary with other products. The exclusive use of those modifications which come within the scope of the claims is contemplated.

What is claimed is:

1. In a mold for metal castings, a flask, elements extending across said flask for supporting the mold sand therein, and means mounted on said flask adjacent some of said elements for moving the latter and the mold sand supported thereby relative to the remainder of the mold.

2. In a mold, a flask, elements extending across said flask for supporting the mold sand therein, and means mounted on said flask adjacent some of said elements for moving the latter and the mold sand supported thereby relative to the remainder of the mold, and removable devices for holding said latter-mentioned elements against such relative movement.

3. In a mold for metal castings, a flask, a grid member extending between and secured to the sides of said flask, a grid member adjacent said first-mentioned member, having projections extending through openings in the sides of the flask, each of said members comprising a plurality of interconnected spaced elements, said openings being elongated, relative to said projections, and means for moving said second-mentioned member relative to said first-mentioned member without disassembly from said flask, said means being mounted on said flask and connected to said second-mentioned member.

4. In a flask for a sectional mold, an end plate hinged to the flask so as to swing away from the mold sand, when the flask mold is completed, to a position in which the flask can be juxtaposed to a like flask to form a continuous matrix.

5. In a flask for a sectional mold, side walls, an end wall of less depth than said side walls, pivots between said end wall and said side walls, said pivots being adjacent the edge of said end wall spaced from the face of the flask, the ends of said side walls being recessed on the side of said pivots opposite the face of the flask to receive said end wall when the latter is swung 180 degrees about said pivots.

6. In an elongated mold, a drag, a cope, said drag having alternate sections movable relative to each other, a plurality of fluid pressure jacks on said cope engaging some of said drag sections at intervals throughout the length of the mold, and means for supplying fluid under pressure to all of said jacks to move alternate drag sections away from the mold matrix.

HARRY E. ROGERS.